April 4, 1961 H. H. McCOWEN ET AL 2,978,300
REACTION VESSEL
Filed June 17, 1958 2 Sheets-Sheet 2

INVENTORS
HOWELL H. McCOWEN
NEVIN W. KIRCHER
BY
Oberlin & Limbach
ATTORNEYS

United States Patent Office 2,978,300
Patented Apr. 4, 1961

2,978,300

REACTION VESSEL

Howell H. McCowen, Florence, and Nevin W. Kircher, Covington, Ky., assignors to The Standard Oil Company, Cleveland, Ohio, a corporation of Ohio Filed June 17, 1958, Ser. No. 742,617

2 Claims. (Cl. 23—285)

This invention relates to an improved reaction vessel for use in operations which require fluid from an external source to be supplied to a charge of material within the vessel, preferably in such manner as to ensure intimate contact between the two.

As will appear from the detailed description to follow, we have been particularly concerned with vessels employed for air oxidation of asphalt, usually carried out with the aid of solid granular catalyst mixed in the molten asphalt, and accordingly the invention has special significance in this particular operation. However, there are many processes which similarly involve discharge of a gas or liquid in a vessel of this type, with the latter containing another fluid or even particulate solids, and it is, then, a primary object of our invention to provide a reaction vessel equipped for internal fluid discharge in such manner as to enhance the distribution of the fluid supplied thereby throughout that portion of the vessel in which it is either operative or operated on, depending upon the particular reaction to be carried out.

Another object is to provide such a vessel in which the fluid is discharged simultaneously in a number of different directions over substantially the entire area of the vessel, with at least one such discharge producing general rotary movement of the fluid.

A further object of the invention is to provide a vessel of recirculating type, i.e., one in which a liquid or other flowable charge is continuously withdrawn and returned, so constructed as to be capable of producing a highly turbulent supply of fluid to the charge or material within the vessel to assist in circulation thereof. In the case of an asphalt oxidizer, operative in this manner, the turbulent air spray in the vessel maintains the granular catalyst employed well-distributed throughout the mass and would, of course, be similarly effective to maintain uniformity of other mixtures and suspensions.

It is also an object to provide a vessel so equipped for circulation in which at least a portion of the external fluid discharge sweeps the surface about the material outlet to ensure that the charge is agitated in this particular region and to entrain any solids and the like which may become separated due to baffle effect of such surface.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 4 is an elevation of one of the fluid discharge elements used in the vessel; and Fig. 5 is a section of such element taken on the line 5—5 in Fig. 4.

Figure 1:
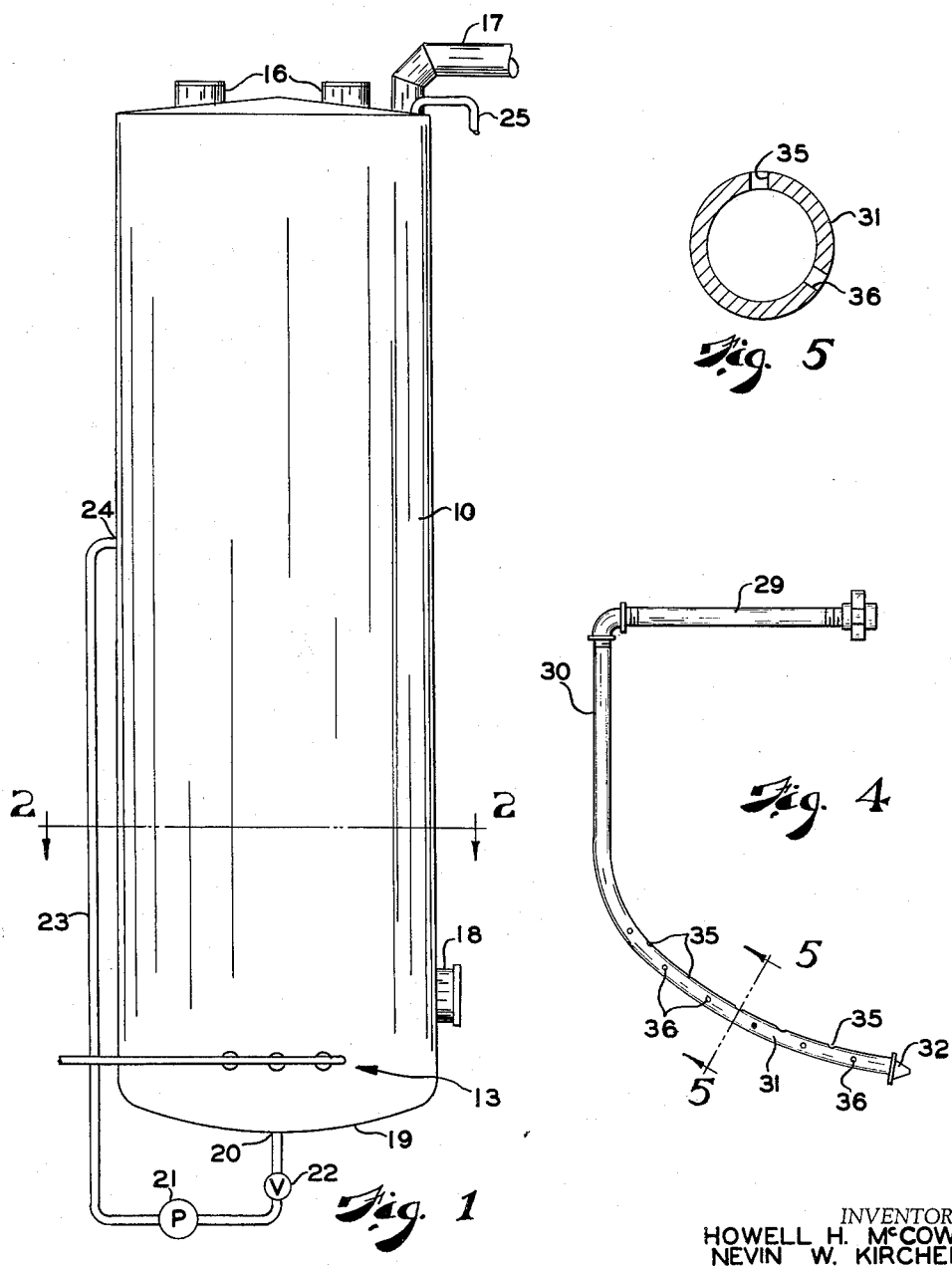
Fig. 1 is a side elevation of a reaction vessel constructed in accordance with the present invention.
Figure 2:
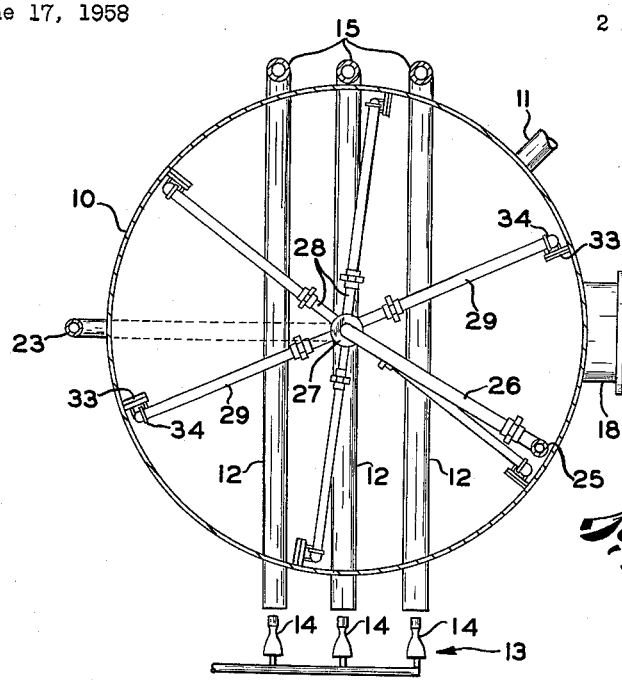
Fig. 2 is a transverse section of the vessel, on a slightly enlarged scale, with the plane of this section being shown approximately by the line 2—2 in Fig. 1.
Figure 3:
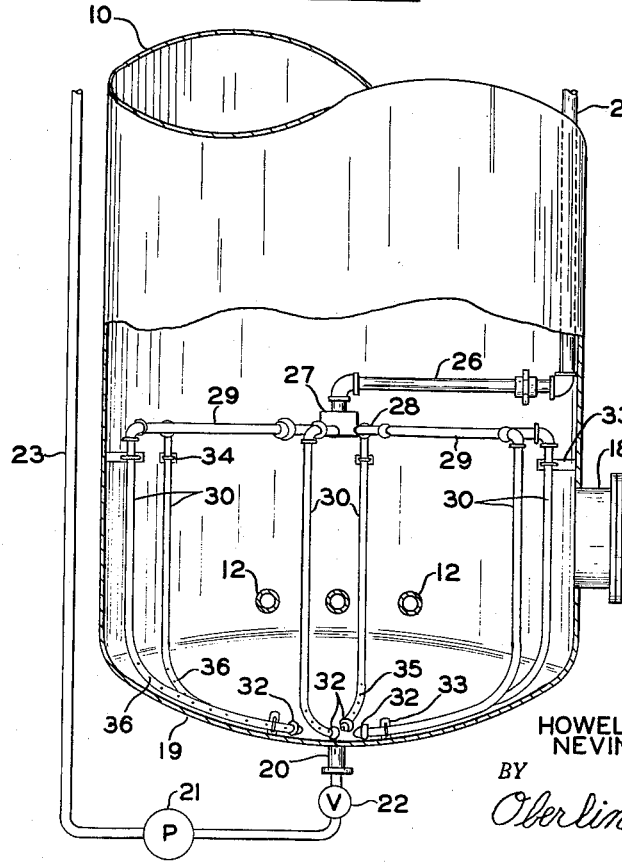
Fig. 3 is an elevation of the bottom portion of the vessel, to the same scale as Fig. 2 and with the near wall broken away to show the inner structure.

Referring now to the drawings in detail, the illustrated embodiment of our invention is a reaction vessel which was designed and has been operated successfully as an asphalt oxidizer, such vessel being vertically elongated and cylindrical with the major wall thereof being designated by reference numeral 10. The molten asphalt is introduced through a charging line 11 and to maintain the same liquid within the vessel, a plurality of burner tubes 12 extend completely through the bottom portion. A combustion heater designated generally by reference numeral 13, is provided at one side, with a plurality of flame nozzles 14 respectively aligned with the open ends of the burner tubes at such side, and a vertical exhaust tube 15 is connected to each burner tube externally of the vessel at the other side.

Explosion hatches 16 are provided at the top of the vessel, and a fume duct 17, likewise at the top, vents the vessel and serves to conduct fumes produced in operation thereof to some removed point for appropriate disposition. Access to the interior of the vessel may be had through a manhead 18, for usual inspection and maintenance procedures. The bottom 19 of the vessel is dished, as illustrated and an outlet 20 for the material is located centrally in the same.

This vessel is equipped for recirculation, and we have shown such a system in simplified schematic form as comprising a pump 21 connected to the bottom outlet through a valve 22 to apply suction at the latter and to force the material withdrawn through an external return line 23 to an inlet 24 preferably located above the midpoint of the vessel.

The air needed to oxidize the asphalt is supplied to the vessel under pressure from a suitable external source, not shown, through a line 25 which enters at the top of the vessel and proceeds downwardly adjacent the wall to a point which is here appreciably below the mid-point. A horizontal pipe 26 is connected to the lower end of the vertical line 25 and extends inwardly to the center of the vessel where it connects through a downturned elbow to a cylindrical distributor 27 having a plurality of radially extending nipples 28 communicating with its inner chamber. A horizontal pipe 29 is connected, as an extension, to each nipple and is of such length that its outer end is proximate to the vessel wall. By means of elbow connectors, discharge pipes 30 are joined to the ends of these radial extensions.

As shown most clearly in Figs. 4 and 5, each such discharge pipe 30 extends downwardly in a first portion substantially parallel to the vessel axis and then curves inwardly to follow the contour of the dished bottom 19 of the vessel. Such curved portions 31 terminate in discharge nozzles 32 closely adjacent the bottom outlet 20, with the several such nozzles thus ringing the opening in spaced relation. The assembly described is supported by means of angle braces 33 secured to the side wall and bottom of the vessel near the ends of each discharge pipe 30, these end portions being clamped to the braces by means of U-bolts 34.

The curved portion 31 of each such discharge pipe has a first series of orifices 35 in longitudinally spaced relation along its upper periphery and a second series of spaced orifices 36 displaced more than 90° to one side.

The side orifices, which are at corresponding sides of the several discharge pipes in the array, are thus directed laterally and downwardly, an angular displacement of 125° having been used and shown in the drawings. Preferably, the side orifices alaternate longitudinally with the top orifices.

Three types of air discharge are thus provided, viz., (1) generally upward discharge from the top orifices 31 or, more exactly, discharge normal to the bottom of the vessel, (2) lateral discharge through the side orifices 36 which produces rotary movement of the air, in this case generally counterclockwise, and because of its downward inclination, sweeps the surface of the vessel bottom, and (3) a radially inward discharge at several points about the bottom outlet 20 through the end nozzles 32.

In the particular installation discussed, phosphorus pentoxide in granular form is added to the asphalt to give higher penetration for a given softening point than would be obtained without the use of such a catalyst, and the cumulative effect of the several types of air discharge provided maintain the catalyst distributed through and held in suspension in the asphalt being oxidized. Should the catalyst particles, or any other solids, tend to settle, they are agitated by the air jets which sweep the bottom surface and moved by the end nozzles to the outlet at the lowermost point where they are withdrawn and returned by the circulating system to the upper portion of the charge within the vessel.

We have shown a fluid distributor comprising six discharge pipes, but obviously the number is not critical, with both the number of such pipes and the number of orifices provided therein being selected as may be best suited for the size and intended operation of the vessel. The spray or fluid supply should of course produce high turbulence for intimate contact with the material stored in the vessel and be effective to provide the rotary sweep of the bottom surface and the assist in the suction withdrawal, as discussed.

Other modes of applying the principle of the invention may be employed, change being made as regards the details described, provided the features stated in any of the following claims or the equivalent of such be employed.

We, therefore, particularly point out and distinctly claim as our invention:

1. In a vessel having an outwardly dished bottom surface and a central material outlet therein, a plurality of discharge pipe sections extending radially inwardly from about the wall of the vessel at substantially uniform spacing from the bottom surface thereof and with their inner ends disposed about said material outlet, and common delivery means for supplying fluid under pressure to said discharge pipe sections at the outer end portions of the same, said sections having inner end discharge openings for radial inward discharge of the fluid toward the central material outlet of the vessel, each section also being provided with a plurality of orifices spaced longitudinally apart along the top thereof for discharge of fluid substantially normal to the bottom surface, these sections each further having longitudinally spaced orifices at corresponding sides of the same directed outwardly and downwardly for rotary discharge of the fluid sweeping about the bottom surface of the vessel.

2. In an upright cylindrical vessel having an outwardly dished bottom surface and a central material outlet therein, means for supplying fluid under pressure from an external source to the vessel, said means comprising a delivery pipe leading from the outside of the vessel to an inner point intermediate the ends and on the axis of the same, a plurality of flow branches commonly joined to said delivery pipe at such inner point and extending substantially radially outwardly therefrom to points adjacent the wall of the vessel, a pipe connected to each of said flow branches at the outer end thereof and extending downwardly adjacent the vessel wall substantially to the bottom surface, the plural pipes having lower extensions which extend radially inwardly from about the wall of the vessel at substantially uniform spacing from the bottom surface and with their inner ends disposed about the central material outlet in the same, the lower radial extensions of the pipes having inner end discharge openings for radial inward discharge of the fluid toward the central outlet, each extension also being provided with a plurality of orifices spaced longitudinally apart along the top thereof for discharge of fluid substantially normal to the bottom surface, and the extensions being further provided with longitudinally spaced orifices at corresponding sides of the same directed outwardly and downwardly for rotary discharge of the fluid sweeping about the bottom surface of the vessel.

References Cited in the file of this patent

UNITED STATES PATENTS

| | | |
|---|---|---|
| 98,425 | Shaffner | Dec. 28, 1869 |
| 881,434 | Moburg | Mar. 10, 1908 |
| 2,375,729 | Caldwell | May 8, 1945 |
| 2,639,981 | Carr | May 26, 1953 |